United States Patent [19]

Ernst

[11] Patent Number: 4,972,599
[45] Date of Patent: Nov. 27, 1990

[54] POSITION MEASURING DEVICE WITH AN ADJUSTING DEVICE

[75] Inventor: Alfons Ernst, Traunreut, Fed. Rep. of Germany

[73] Assignee: Johannes Heidenhain Gmbh, Traunreut, Fed. Rep. of Germany

[21] Appl. No.: 500,468

[22] Filed: Mar. 28, 1990

[30] Foreign Application Priority Data

May 13, 1989 [DE] Fed. Rep. of Germany ....... 3915679

[51] Int. Cl.$^5$ .......................... G01D 5/34; G01B 11/02
[52] U.S. Cl. ....................................... 33/706; 33/1 N; 33/1 PT
[58] Field of Search ................. 33/700, 702, 706, 707, 33/708, 1 N, 1 L, 1 PT, 645, DIG. 8; 250/231.13, 231.14, 231.16, 237 R

[56] References Cited

U.S. PATENT DOCUMENTS 3,886,354  5/1975  Swiden et al. ............. 250/231.14 X
4,544,915 10/1985  Wieme et al. .............. 250/231.14 X
4,870,272  9/1989  Wilson ........................ 250/237 G X Primary Examiner—Harry N. Haroian
Attorney, Agent, or Firm—Toren, McGeady & Associates

[57] ABSTRACT

A position measuring device including an adjusting device for a sensing device of a graduation. The sensing device is adjustable relative to the graduation by the adjusting device. For the adjustment, the sensing device has three oblong holes whose longitudinal axes extend perpendicularly to each other. A cylindrical pin fixed in the adjusting device engages in one of the oblong holes. Two adjusting screws which have eccentric portions and engage in the oblong holes are used for adjusting the adjusting device in radial and tangential directions, so that the sensing device can be adjusted exactly relative to the graduation of the position measuring device.

4 Claims, 1 Drawing Sheet

POSITION MEASURING DEVICE WITH AN ADJUSTING DEVICE

BACKGROUND OF THE INVENTION

1. Field of the Invention

The present invention relates to a position measuring device with an adjusting device for a sensing device of a graduation. The adjusting device serves the purpose to adjust the sensing device in a plane extending parallel to the plane of the graduation.

2. Description of the Related Art

In incremental position measuring devices in which the graduation is constructed as a periodic grid, the grid is photoelectrically sensed by a sensing device which also has a corresponding grid graduation. The grids of the graduation and of the sensing device are adjusted to each other in order to optimize the sensing signals. When the grids are arranged parallel to each other in two planes and the grids extend at a small angle relative to each other, such an adjustment is called a moiré adjustment. Such an adjustment is described, for example, in German patent No. 10 40 268. The moiré adjustment must be very precise and should be durable, but should not be very complicated.

It is, therefore, the primary object of the present invention to provide a position measuring device of the above-described type in which the sensing device can be exactly adjusted by means of an adjusting device in a plane extending parallel to the plane of the graduation and which does not significantly increase the manufacturing costs.

SUMMARY OF THE INVENTION

In accordance with the present invention, at least two guideways are provided in the sensing device, wherein the longitudinal axes of the guideways extend transversely of each other. At least two eccentrically mounted projections engage in the transversely extending guideways. The projections are adjustable independently of each other for adjusting the sensing device.

In accordance with an advantageous feature of the invention, the guideways are linear guides whose longitudinal axes extend perpendicularly to each other. The linear guides may be three oblong holes. In addition, one of the oblong holes and a pin form a pivot point around which the sensing device can be pivoted to a limited extent.

The present invention provides the particular advantage that it can be used in angle measuring devices as well as in linear measuring devices. In addition, after the adjustment has been carried out, the sensing device can be extremely rigidly fixed because no tension springs and/or compression springs are used. Also, the device according to the present invention can be easily manufactured and manipulated.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figures 1, 2:
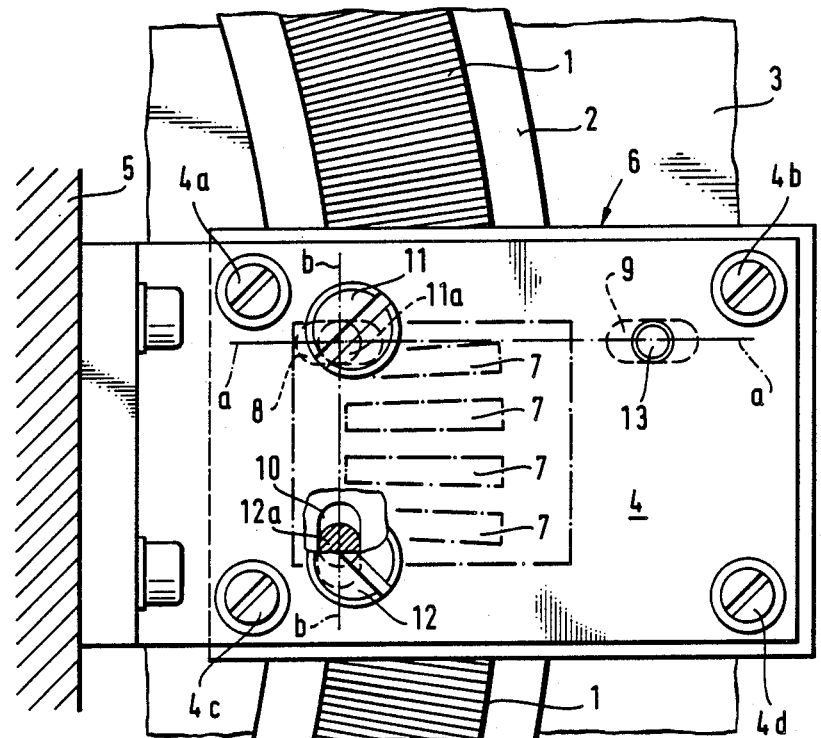
FIG. 1 is a partial side view of an angle measuring device mounted on a machine.
FIG. 2 is a top view of the angle measuring device of FIG. 1.

As mentioned above, the invention can be used in angle measuring devices as well as linear measuring devices. The present invention is described below in connection with an angle measuring device.

FIGS. 1 and 2 of the drawing are views of the same angle measuring device and, therefore, the same structural components have the same reference numerals in both figures.

As shown in FIG. 1, a graduation 1 is mounted by means of a carrier member 2 on a rotor 3 of a machine which is not illustrated and explained in detail. A sensing device 6 is fastened to a stator 5 of the machine through an adjusting device 4 by means of fastening screws 4a, 4b, 4c, 4d. The sensing device 6 senses the graduation 1 when the rotor 3 and the stator 5 move relative to each other. For sensing the graduation 1, the sensing device 6 also has a grid graduation in the form of four sensing zones or areas 7, as is known in the art.

The above-described adjustment is to be carried out between the graduation 1 and the sensing zones 7. To make the adjustment particularly simple, three oblong holes 8, 9 and 10 are provided in the area of the scanning device 6 which faces the adjustment device 4. Two of the oblong holes, i.e., oblong holes 8 and 9, have a common longitudinal axis a. The longitudinal axis b of the third oblong hole 10 extends perpendicularly to the longitudinal axis a of the oblong holes 8 and 9.

Adjusting screws 11 and 12 with sufficient self-locking action are arranged in the adjusting device 4. The adjusting screws 11 and 12 each have an eccentric projection 11a and 12a, respectively, which engage in the oblong holes 8 and 10. In addition, a cylindrical pin 13 engages in the second oblong hole 9, wherein the longitudinal axis a of the oblong hole 9 coincides with or at least extends parallel to the longitudinal axis a of the oblong hole 8.

After the fastening screws 4a, 4b, 4c, 4d have been loosened, the sensing device 6 can be adjusted as follows:

For an adjustment in radial direction, the adjustment screw 12 is turned. The eccentric projection 12a which is located with exact fit between the narrow sides of the oblong hole 10 moves the sensing device in radial direction. The longitudinal axis b of the oblong hole 10 is displaced in radial direction parallel to the oblong hole. The oblong hole axis a which extends perpendicularly to the oblong hole axis b and, thus, extends in radial direction, forms the guidance for the sensing device 6 in radial direction.

For an adjustment in tangential direction, the adjusting screw 11 with its eccentric projection 11a is turned. The oblong hole 10 and the eccentric projection 12a of the adjusting screw 12 then form the tangential guidance of the sensing device 6. In order to fix the sensing device 6, a pivot point is provided which is formed by the cylindrical pin 13 and the oblong hole 9. During the tangential adjustment of the sensing device 6, the restraint or guidance by means of the oblong hole 10 and the projection 12a and the engagement between the oblong hole 9 and the pin 13 cause the sensing device 6 to perform a slight pivoting movement, so that the longitudinal axes a and b of the oblong holes are slightly displaced while still extending perpendicularly to each other. As a result, the sensing zones 7 of the sensing device 6 are aligned exactly relative to the graduation 1. When the described procedure is concluded, the sensing device 6 is fixed in the correct position by means of fastening screws 4a, 4b, 4c, 4d.

It is within the scope of the present invention to replace the oblong holes 8, 9, 10 by other guideways, for example, linear guides. Of course, a reverse arrangement of the oblong holes and adjusting screws is also possible, such that the oblong holes are provided in the adjusting device and the eccentric adjusting screws are provided in the sensing device.

While a specific embodiment of the invention has been shown and described in detail to illustrate the application of the inventive principles, it will be understood that the invention may be embodied otherwise without departing from such principles.

I claim:

1. In a position measuring device including an adjusting device for a sensing device of a graduation, the graduation extending in a plane, wherein the adjusting device is provided for adjusting the sensing device in a plane which extends parallel to the graduation plane, the improvement comprising at least two guideways being provided in the sensing device, each guideway having a longitudinal axis, the longitudinal axes of the two guideways extending transversely of each other, at least two projections being eccentrically mounted in the adjusting device and engaging in the transversely extending guideways, the at least two projections being adjustable independently of each other for adjusting the sensing device.

2. The position measuring device according to claim 1, wherein the guideways are linear guides whose longitudinal axes extend perpendicularly to each other.

3. The position measuring device according to claim 2, wherein the linear guides are three oblong holes.

4. The position measuring device according to claim 1, wherein an oblong hole and a pin form a pivot point, the sensing device being slightly pivotable about the pivot point.

* * * * *

UNITED STATES PATENT AND TRADEMARK OFFICE
CERTIFICATE OF CORRECTION

PATENT NO.   : 4,972,599

DATED        : November 27, 1990

INVENTOR(S)  : Alfons Ernst

It is certified that error appears in the above-identified patent and that said Letters Patent is hereby corrected as shown below:

On the title page, item [73] should read:

[73] Assignee: "Dr. Johannes Heidenhain GmbH".

Signed and Sealed this

Sixteenth Day of June, 1992

Attest:

DOUGLAS B. COMER

Attesting Officer

Acting Commissioner of Patents and Trademarks